United States Patent [19]

Nakayama et al.

[11] Patent Number: 4,829,388
[45] Date of Patent: May 9, 1989

[54] MAGNETIC RECORDING APPARATUS

[75] Inventors: Yoshiaki Nakayama; Takahiro Ohta, both of Tokyo, Japan

[73] Assignee: Fuji Photo Film Co., Ltd., Kanagawa, Japan

[21] Appl. No.: 78,159

[22] Filed: Jul. 27, 1987

[30] Foreign Application Priority Data

Aug. 4, 1986 [JP] Japan ................................. 61-182006
Aug. 4, 1986 [JP] Japan ................................. 61-182007

[51] Int. Cl.⁴ .............................................. H04N 5/78
[52] U.S. Cl. ................................... 360/35.1; 360/38.1
[58] Field of Search ..................... 360/35.1, 38.1, 57; 358/906, 909

[56] References Cited

U.S. PATENT DOCUMENTS 4,719,522 1/1988 Kaneko et al. ..................... 360/38.1

FOREIGN PATENT DOCUMENTS

0127311 12/1984 European Pat. Off. .
0139443  5/1985 European Pat. Off. .
0162689 11/1985 European Pat. Off. .
0167806  1/1986 European Pat. Off. .
0168155  1/1986 European Pat. Off. .

Primary Examiner—Eugene R. LaRoche
Assistant Examiner—David Mis
Attorney, Agent, or Firm—Birch, Stewart, Kolasch & Birch

[57] ABSTRACT

A magnetic recording apparatus such as a still video recording or an electronic camera includes a circuit for detecting a video signal immediately previously recorded on a track of a video disk to detect whether or not dropout exists in the video signal. Upon the detection of dropout, the recorded track is erased and the identical video signal is re-recorded on the same track. While the track is erased and re-recorded upon, dust or other foreign matter causing the dropout will be naturally removed from a magnetic recording head or the video disk so that the re-recorded signal is dropout free.

8 Claims, 9 Drawing Sheets

PERCENTAGE OF ERASED DROPOUTS

X (78%) | Z (22%)  n = 67

X: ERASED BY ONE ERASING AND RE-RECORDING

Y: NOT ERASED

FIG. 10

NO. OF TIMES OF ERASING AND RE-RECORDING

ONE | TWO | THREE | FOUR | FIVE
(66%) (5%)(11%) (15%) (3%)

MAGNETIC RECORDING APPARATUS

BACKGROUND OF THE INVENTION

This invention relates to a magnetic recording apparatus, and more particularly to an apparatus in which means are provided to deal with an accidental dropout attributable to, for example, attachment or deposit of dust or like foreign matter to a magnetic floppy disk or a magnetic head thereby ensuring effective magnetic recording of a video signal on the floppy disk.

A still video recorder and an electronic still camera have been developed as magnetic recording apparatus magnetically recording still pictures on a magnetic recording medium such as a magnetic floppy disk.

In the still video recorder, a still-picture video signal is recorded on and reproduced from each of a plurality of concentric tracks formed on a small-sized magnetic floppy disk loaded in the recorder. That is, in the record mode, a video signal representing one scene is applied from an external video apparatus (for example, a video camera, a video tape recorder, a video disk recorder or a television receiver) and is allotted to one of the tracks of the floppy disk to be recorded thereon. In the playback mode, a desired video signal is reproduced from a desired track of the floppy disk, and the reproduced video signal is transmitted to an external monitoring apparatus (for example, a television receiver) to display the still picture on the screen of the monitoring apparatus.

In the electronic still camera, an optical image formed by an optical lens system is converted into an electrical image signal by a solid-state imaging device, and a video signal obtained by means such as frequency modulation of the image signal is recorded on a miniature magnetic floppy disk. In the playback mode, the mini magnetic floppy disk is loaded in a reproducing apparatus, and the recorded video signal is reproduced as a still picture on, for example, the screen of a television receiver.

In the still video recorder described above, dust or like foreign matter may temporarily attach or deposit to the recording surface of the magnetic floppy disk or to a portion of the magnetic head near its magnetic gap. A dropout occurs when a video signal is recorded on such a magnetic floppy disk or by such a magnetic head to which the dust or like foreign matter temporarily attaches or deposits. In most cases, the dust or like foreign matter providing the source of the dropout is naturally removed from the floppy disk or magnetic head after recording. It is apparent that the dropout remains still in the record on the floppy disk even when the dust or like foreign matter is removed after recording.

In the case of the electronic still camera described above, re-photographing cannot be made even if a dropout may occur due to attachment or deposit of dust or like foreign matter to a magnetic floppy disk during the process of magnetic recording. This is because the subject being photographed is moving in most cases, and the same picture cannot be taken by re-photographing, resulting in missing the chance of taking the desired picture of the subject. On the other hand, when a still picture is reproduced from a dropout-containing track of the floppy disk, degradation of the picture quality due to the presence of the dropout will be highlighted.

The inventors assumed that, among dropouts present on a magnetic floppy disk, temporary dropouts except those permanently remaining on the floppy disk generally decrease while erasing and re-recording operations are repeated a plurality of times.

This assumption is based on the finding of the tendency that, when a certain track of the floppy disk is noted, a dropout detected once on that track tends to disappear after repetition of later erasing and re-recording.

In order to confirm the above tendency, the inventors sampled magnetic floppy disks which were rejected as having dropouts in the step of inspection, and conducted the following two tests (1) and (2) on the floppy disks. In the tests, 50 tracks each having a width of 60 $\mu$m were formed on each floppy disk. A 50% white-level signal was used as a signal re-recorded on the floppy disks.

(1) In the first test, changes occurring in the existing dropouts due to repeated erasing and re-recording were investigated. The results are shown in FIG. 9.

(2) In the second test, the number of times of erasing and re-recording operation required for erasing the dropouts was measured for each track. The results are shown in FIG. 10.

Figure 9:
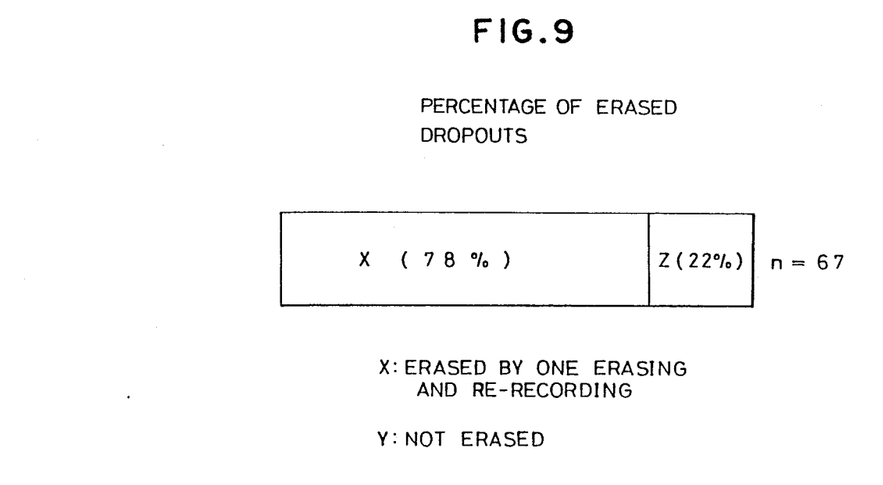
FIG. 9 is a graph showing the percentage of dropouts removed by one erasing and re-recording operation as compared to the percentage of those remaining still after the operation.

The data shown in FIG. 9 indicate that, in the test in which records on 67 dropout-containing tracks were erased and re-recorded, 78% of the dropouts are temporary, and the remaining 22% of the dropouts are permanent or non-erasable.

Figure 10:
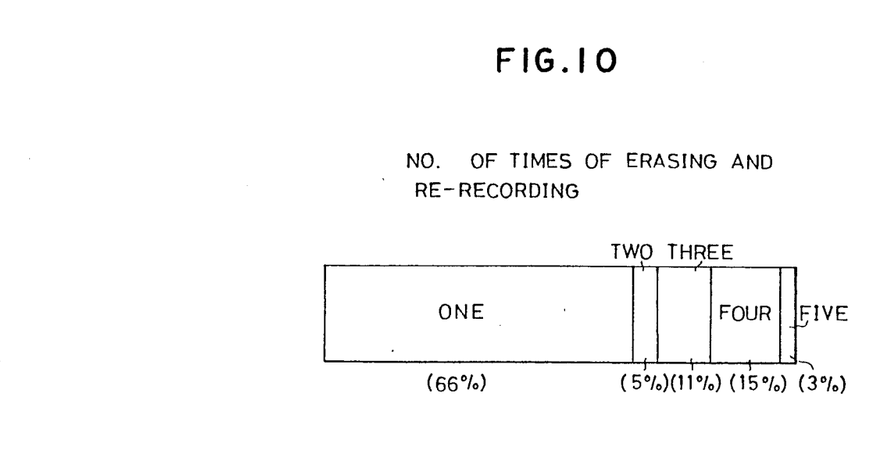
FIG. 10 is a graph showing the percentages of the number of times of erasing and re-recording operation required for removing dropouts.

The data shown in FIG. 10 indicate the number of times of erasing and re-recording operation required until temporary dropouts present on 62 tracks could be removed. In this test, dropouts which could be removed by five times of erasing and re-recording operation were designated as temporary dropouts. It will be seen in FIG. 10 that dropouts present on 66% of the tracks were removed by the first erasing and re-recording operation.

The results shown in FIGS. 9 and 10 sufficiently support the inventors' assumption described above. In other words, the above results imply the existence of an effective measure for decreasing temporary dropouts.

SUMMARY OF THE INVENTION

Based on the inventors' idea and the data backing up the finding described above, it is a primary object of the present invention to provide a still video recorder and an electronic still camera including means for effectively minimizing the possiblity of occurrence of a dropout attributable to attachment or deposit of dust or like foreign matter.

It is the basic technical idea of the still video recorder according to the present invention which attains the above object that, when a video signal reproduced from a track of a magnetic floppy disk contains a dropout, the record on that track is erased, and the same video signal is recorded again on the same track from which the record has been erased.

It is also the basic technical idea of the electronic still camera of the present invention which attains the above object that a video signal to be recorded on a track of a magnetic floppy disk is stored in a memory, and, when occurrence of a dropout in the video signal reproduced from that track is detected, the record on that track is erased once, and the same video signal read out from the memory is recorded again on the same track from which the record has been erased.

DESCRIPTION OF THE PREFERRED EMBODIMENTS

Embodiment 1

Figure 1:
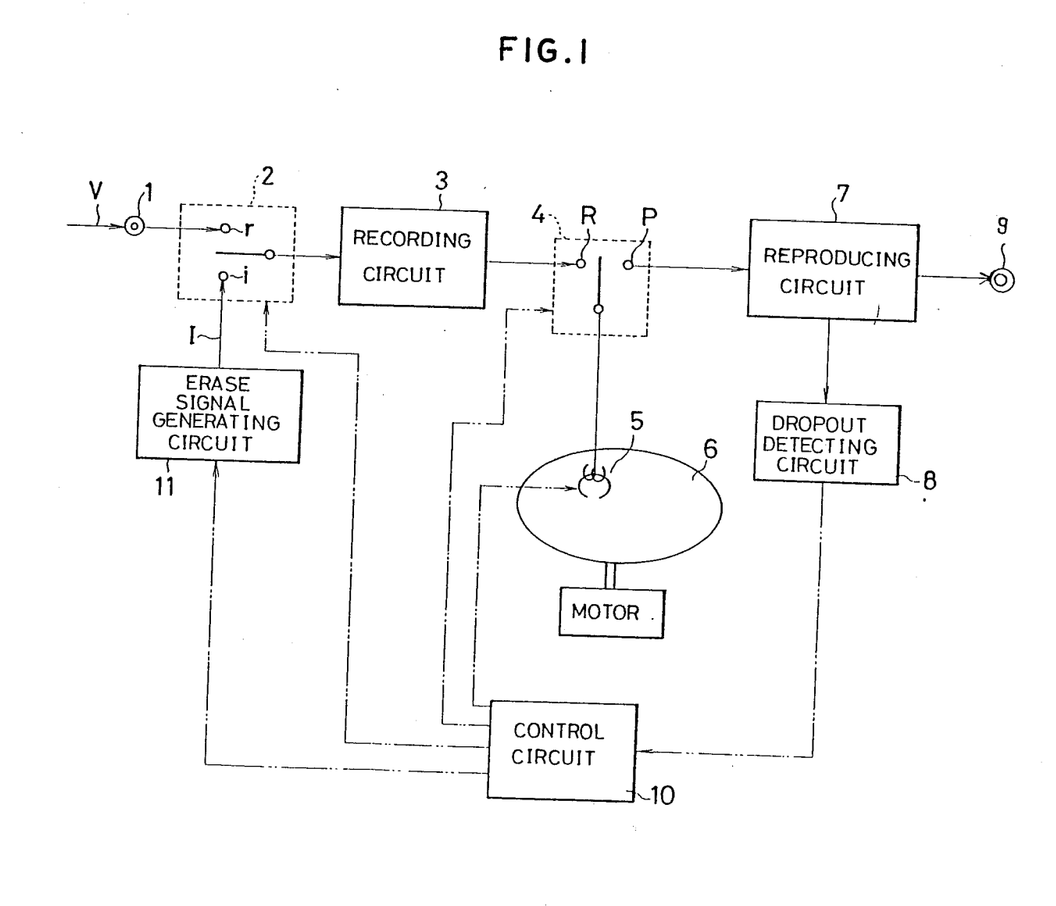
FIG. 1 is a block diagram showing the structure of a still video recorder which is a first embodiment of the present invention.

FIG. 1 is a block diagram showing the structure of a still video recorder which is a first embodiment of the present invention. Referring to FIG. 1, a video signal V is applied to an input terminal 1 of the still video recorder from an external video apparatus (not shown), for example, a video camera, a video tape recorder, a video disk recorder or a television receiver. When a first selector switch 2 is changed over to its position r, and a second selector switch 4 is changed over to its position R, the video signal V passes through the switch 2 is amplified by a recording circuit 3, and the amplified video signal V passed through the switch 4 is recorded by a magnetic head 5 on a predetermined track of a magnetic floppy disk 6. The selector switch 4 is changed over from the position R to a position P as soon as the recording by the magnetic head 5 on the floppy disk 6 has been completed, that is, immediately after the floppy disk 6 has made one complete revolution for the recording. Since the selector switch 4 is now changed over to its position P, the video signal V recorded on the predetermined track of the floppy disk 6 is reproduced by the magnetic head 5, and the reproduced video signal V is amplified by a reproducing circuit 7. The amplified video signal V is applied to an output terminal 9 after being passed through a dropout detecting circuit 8. This output terminal 9 is connected to a monitor (not shown) to display the reproduced still picture on the monitor.

The dropout detecting circuit 8 detects an envelope of the reproduced video signal V and identifies the presence of a dropout when the detected value of the envelope is smaller than a predetermined value or zero. When no dropout is detected by the dropout detecting circuit 8, the magnetic head 5 having recorded the video signal V on the track is shifted to the position on the next adjacent track of the floppy disk 6 to magnetically record another still picture on the next track in a manner as described above. On the other hand, when a dropout is detected by the dropout detecting circuit 8, a control circuit 10 and an erase signal generating circuit 11 cooperate in a manner as described in detail later, so that the record on the track containing the dropout is erased, and the same video signal V is recorded again on the track from which the recording has been erased.

The erasing and re-recording operation will now be described. The control circuit 10 has two operation modes, and its operation in one operation mode differs slightly from that in the other operation mode.

Figure 2:
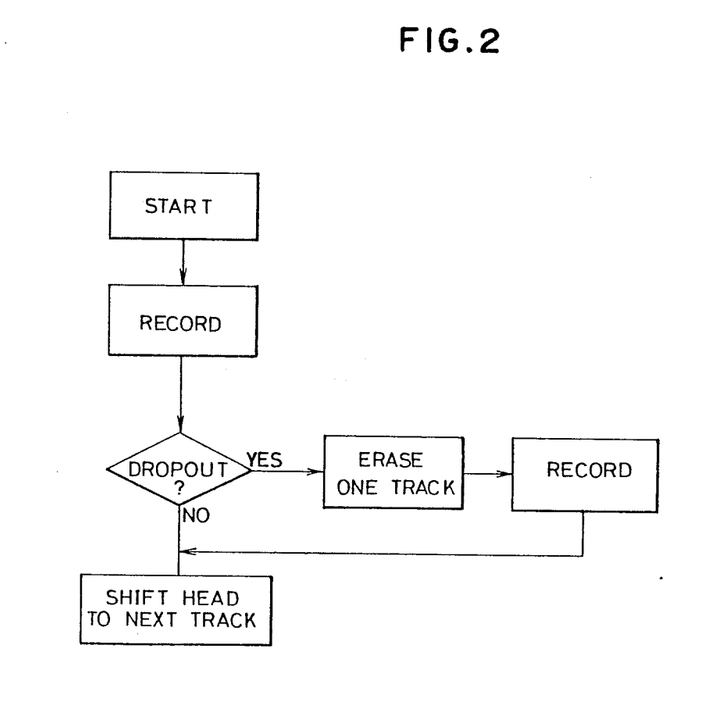
FIGS. 2 and 3 are flow charts illustrating the operation of the first embodiment of the present invention.

The operation of the control circuit 10 in its first mode when the dropout detecting circuit 8 detects a dropout will be described with reference to FIG. 2. When the dropout detecting circuit 8 detects a dropout, the control circuit 10 actuates the erase signal generating circuit 11 and changes over the selector switches 2 and 4 to their positions i and R respectively. An erase signal I generated from the erase signal generating circuit 11 is applied to the magnetic head 5 through the switch 2, recording circuit 3 and switch 4. Since, at this time, the magnetic head 5 is located on the track containing the dropout, the record on this track is erased by the erase signal I. The recording is completely erased while the floppy disk 6 makes several revolutions. An erase-purpose head may be separately provided to erase the recording by this head. After the record has been completely erased, the control circuit 10 changes over the selector switch 2 from the position i to the position r while maintaining the selector switch 4 in the position R. Since the switches 2 and 4 are now in their positions r and R respectively, the same video signal V is re-corded on the same track again from which the recording has been erased. In this case, the possibility of re-recording the video signal V without any dropout is high because, at this time, dust or like foreign matter providing the source of the dropout has probably been naturally removed from the magnetic head 5.

Figure 3:
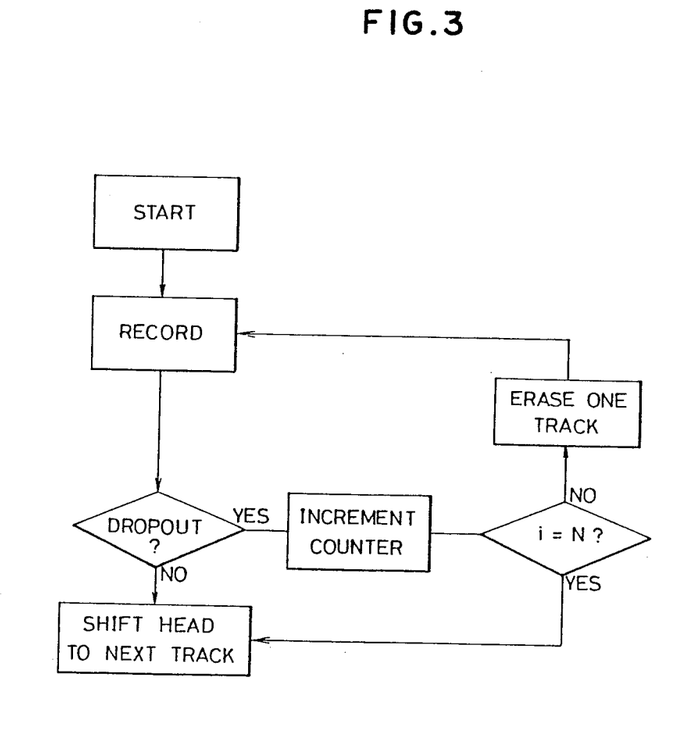

The operation of the control circuit 10 in its second mode will next be described with reference to FIG. 3. As in the case of the first mode, the erasing and re-recording operation is carried out under control of the control circuit 10. In this second mode, the erasing and re-recording operation is repeated again when a dropout still remains in the reproduced video signal V in spite of the signal re-recording. When the dropout does not disappear in spite of the second erasing and re-recording operation, the similar sequence of erasing, re-recording and dropout detection is repeated a predetermined number of times (N times). When the dropout disappears in the course of repetition of the above sequence, the recording of the video signal V on this track is ended. On the other hand, when the dropout does not disappear in spite of repeated execution of the erasing and re-recording operation the predetermined number of times (N times), the operator decides that the floppy disk 6 itself has an inherent defect, such as, local absence of magnetic powder and ceases recording of the video signal V on that track. The magnetic head 5 is then shifted to the position on the next adjacent track of the floppy disk 6 to record the video signal V on the next track.

Embodiment 2

Figure 4:
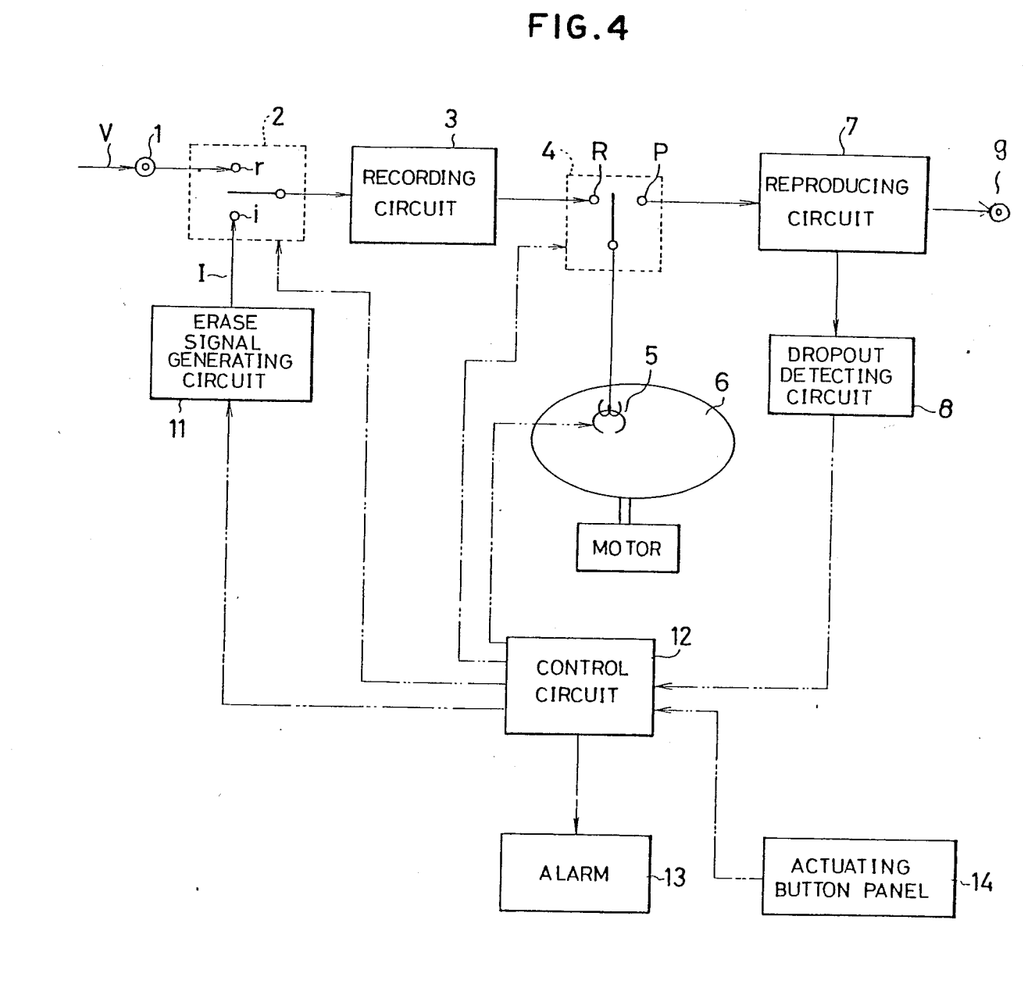
FIG. 4 is a block diagram showing the structure of a still video recorder which is a second embodiment of the present invention.

FIG. 4 is a block diagram showing the structure of a still video recorder which is a second embodiment of the present invention. In FIG. 4, like reference numerals are used to designate like parts appearing in FIG. 1. The reference numerals 1, 2, 3, 4, 5, 6, 7, 8, 9 and 11 designate an input terminal, a first selector switch, a recording circuit, a second selector switch, a magnetic head, a magnetic floppy disk, a reproducing circuit, a dropout detecting circuit, an output terminal, and an erase signal generating circuit, respectively. The second embodiment further comprises a control circuit 12, an alarm circuit 13 and an actuating button panel 14.

In this second embodiment, magnetic recording of video signals on the floppy disk 6 by the magnetic head 5 and detection of a dropout by the dropout detecting circuit 8 are carried out in a manner similar to that of the first embodiment of FIG. 1. When no dropout is detected, the magnetic head 5 is sequentially shifted onto successive tracks to record video signals thereon.

Figure 5:
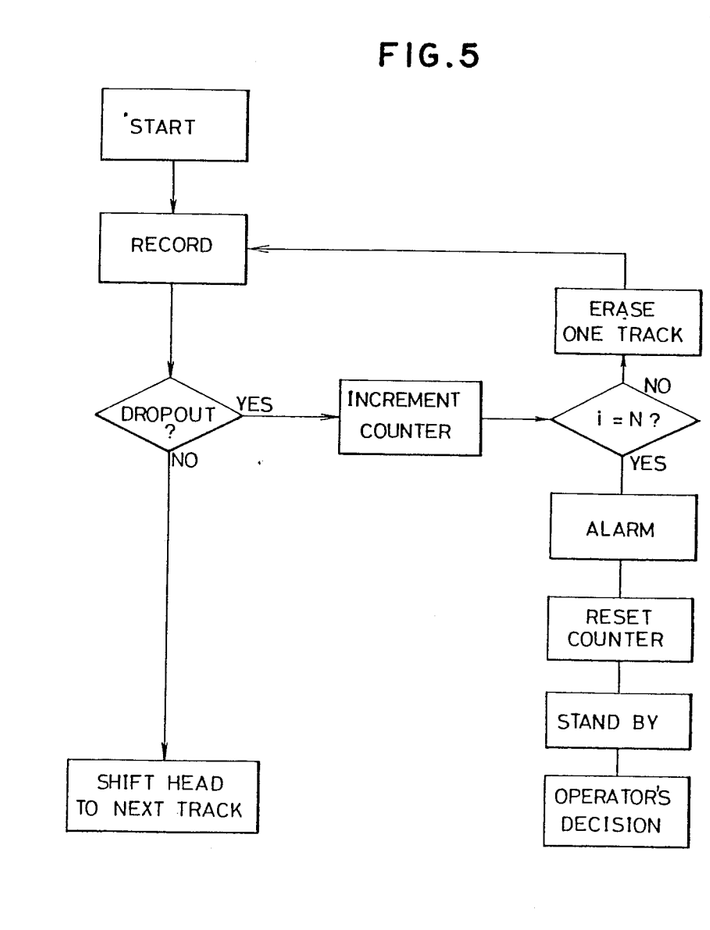
FIG. 5 is a flow chart illustrating the operation of the second embodiment of the present invention.

On the other hand, when a dropout is detected during recording a video signal V on a track of the floppy disk 6, an erase signal I is generated from the erase signal generating circuit 11 under control of the control circuit 12 to erase the recording containing the dropout, and, after erasing the recording, the same video signal V is recorded again on the same track. Thus, when the dropout is removed from the track as a result of the first erasing and re-recording operation, the magnetic head 5 is shifted to the next adjacent track to record another video signal on that track. However, when the dropout still remains in spite of the first erasing and re-recording operation, the erasing and re-recording operation is repeated until the dropout is removed. When the dropout is not removed even after the erasing and re-recording operation is repeated a predetermined number of times (N times), the magnetic head 5 is placed in its stand-by state under control of the control circuit 12, and the alarm circuit 13 issues an alarm signal under control of the control circuit 12. Upon hearing the alarm signal, the operator depresses one of the buttons on the actuating button panel 14 to select one of the following three modes (a), (b) and (c):

(a) The program is returned to the "start" step shown in FIG. 5 to repeat the flow.

(b) When the picture recorded on the track is sufficient in its quality in spite of the presence of the dropout, the record is not erased, and the magnetic head 5 is shifted to the next adjacent track to record a new video signal thereon.

(c) The magnetic head 5 is shifted to the next adjacent track to record the same video signal on that track.

According to the embodiments of the still video recorder of the present invention described above, a video signal recorded on a track of a floppy disk is automatically erased when an accidental dropout due to attachment of dust or like foreign matter is detected, and the same video signal is then recorded on the same track again. Therefore, occurrence of dropouts can be minimized. Further, the still video recorder of the present invention operates with high reliability even when it is used in an environment such as a home or a store where it is exposed to much dust.

Embodiment 3

Figure 6:
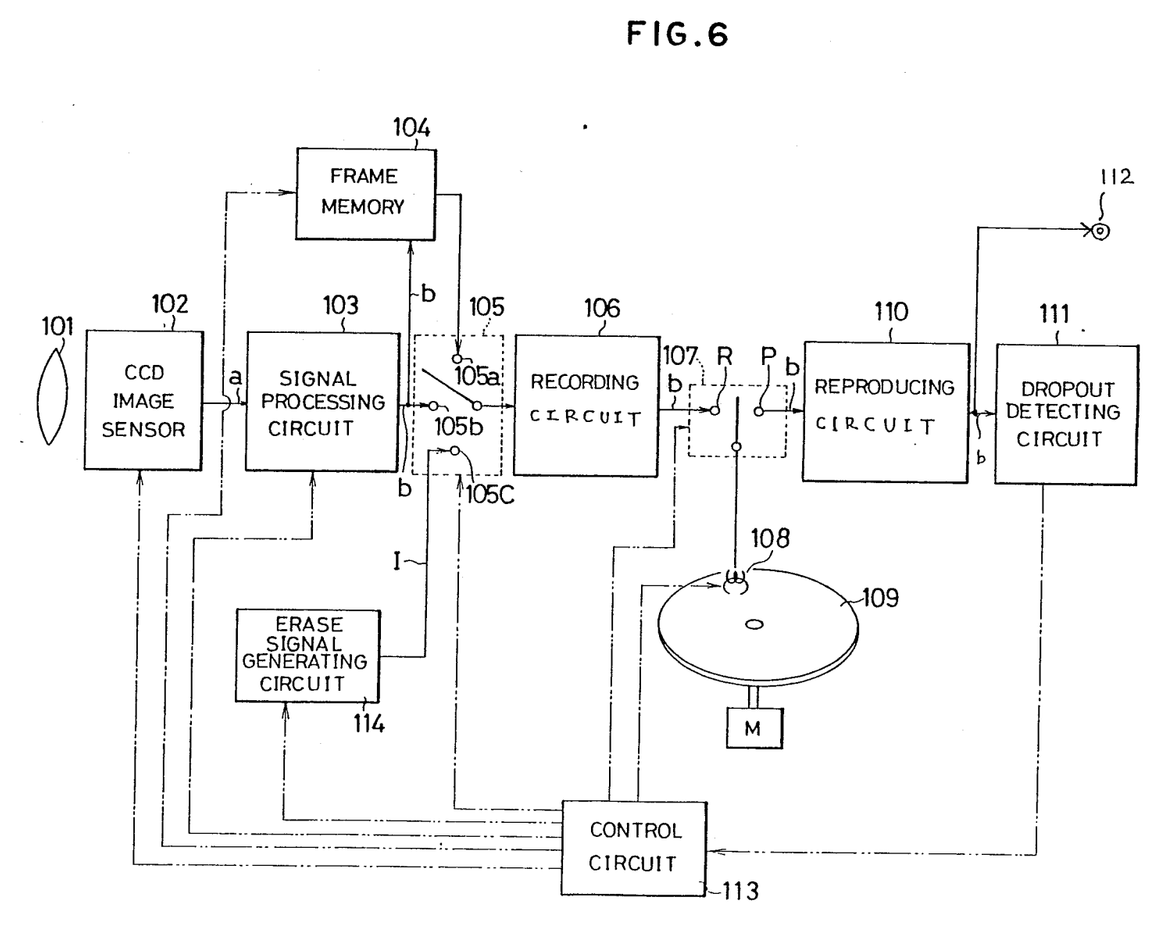
FIGS. 6, 7 and 8 are block diagrams showing the structure of electronic still cameras which are a third, a fourth and a fifth embodiment of the present invention respectively.

FIG. 6 is a block diagram showing the structure of an electronic still camera which is a third embodiment of the present invention. Referring to FIG. 6, an optical image of a subject is formed by an optical lens system 101 in response to the operation of a shutter of the electronic still camera and is applied as an optical input to an image sensor 102 provided by a charge coupled device (CCD). The image sensor 102 generates an electrical image signal a corresponding to the optical image input, and this image signal a is applied to a signal processing circuit 103. In the signal processing circuit 103, the image signal a is subjected to signal processing including frequency modulation to be converted into a video signal b. This video signal b is partly applied to a frame memory 104 to be stored therein. When a first selector switch 105 is changed over to its position 105b, and a second selector switch 107 is changed over to its position R, the video signal b appearing from the signal processing circuit 103 passes through the switch 105 and is then amplified by a recording circuit 106. The amplified video signal b passes through the switch 107 and is then recorded by a magnetic head 108 on a predetermined track of a magnetic floppy disk 109. The selector switch 107 is changed over from the position R to a position P as soon as the recording by the magnetic head 108 on the floppy disk 109 has been completed, that is, immediately after the floppy disc 109 has made one complete revolution for the recording. Since the selector switch 107 is now changed over to its position P, the video signal b recorded on the track of the floppy disk 109 is reproduced by the magnetic head 108, and the reproduced video signal b is amplified by a reproducing circuit 110. The amplified video signal b is applied to an output terminal 112 and a dropout detecting circuit 111.

The dropout detecting circuit 111 detects an envelope of the reproduced video signal b and identifies the presence of a dropout when the detected value of the envelope is smaller than a predetermined value or zero. When no dropout is detected by the dropout detecting circuit 111, the magnetic head 108 having recorded the video signal b on the track is shifted to the position on the next adjacent track of the floppy disk 109, and the frame memory 104 is cleared. Then, in response to the opening of the shutter, another optical image is magnetically recorded on the next track in a manner as described above. On the other hand, when a dropout is detected by the dropout detecting circuit 111, a control circuit 113 and an erase signal generating circuit 114 cooperate in a manner as described in detail later, so that the recording on the track containing the dropout is erased, and the video signal b stored in the frame memory 104 is read out and recorded on the track from which the record has been erased.

The erasing and re-recording operation will now be described. When the dropout detecting circuit 111 detects a dropout, the control circuit 113 actuates the erase signal generating circuit 114 and changes over the selector switches 105 and 107 to their positions 105c and R respectively. An erase signal I generated from the erase signal generating circuit 114 is applied to the magnetic head 108 through the switch 105, recording circuit 106 and switch 107. Since, at this time, the magnetic head 108 is located on the track containing the dropout, the recording on this track is erased by the erase signal I. The reording is completely erased while the floppy disk 109 makes several revolutions. An erase-purpose head may be separately provided to erase, the record by this head. After the recording has been completely erased, the control circuit 113 changes over the selector switch 105 from the position 105c to a positon 105a while maintaining the selector switch 107 in the position R, and the video signal b stored in the frame memory 104 is read out under control of the control circuit 113. The video signal b read out from the frame memory 104 is recorded on the same track again from which the recording has been erased. In this case, the video signal b can be recorded again without any dropout because, at this time, dust or like foreign matter providing the source of the dropout has been probably naturally removed from the magnetic head 108.

When the dropout still remains in spite of execution of the erasing and re-recording operation in the manner described above, the erasing and re-recording operation is repeated until the dropout disappears. When the dropout does not disappear in spite of repeated execution of the erasing and re-recording operation a predetermined number of times, the operator decides that the floppy disk 109 itself has an inherent defect, such as, local absence of magnetic powder. In such a case, the video signal b read out from the frame memory 104 is recorded on the next adjacent track or another new track.

Also, upon detection of the track containing the dropout, the video signal read out from the frame memory 104 may be recorded on another track immediately after erasing the record on the defective track or without erasing the record.

During the erasing and re-recording operation described above, the user of the camera cannot take pictures. Until the above operation is completed, photographing by the user is inhibited by a visual display or an audible alarm.

Embodiment 4

Figure 7:
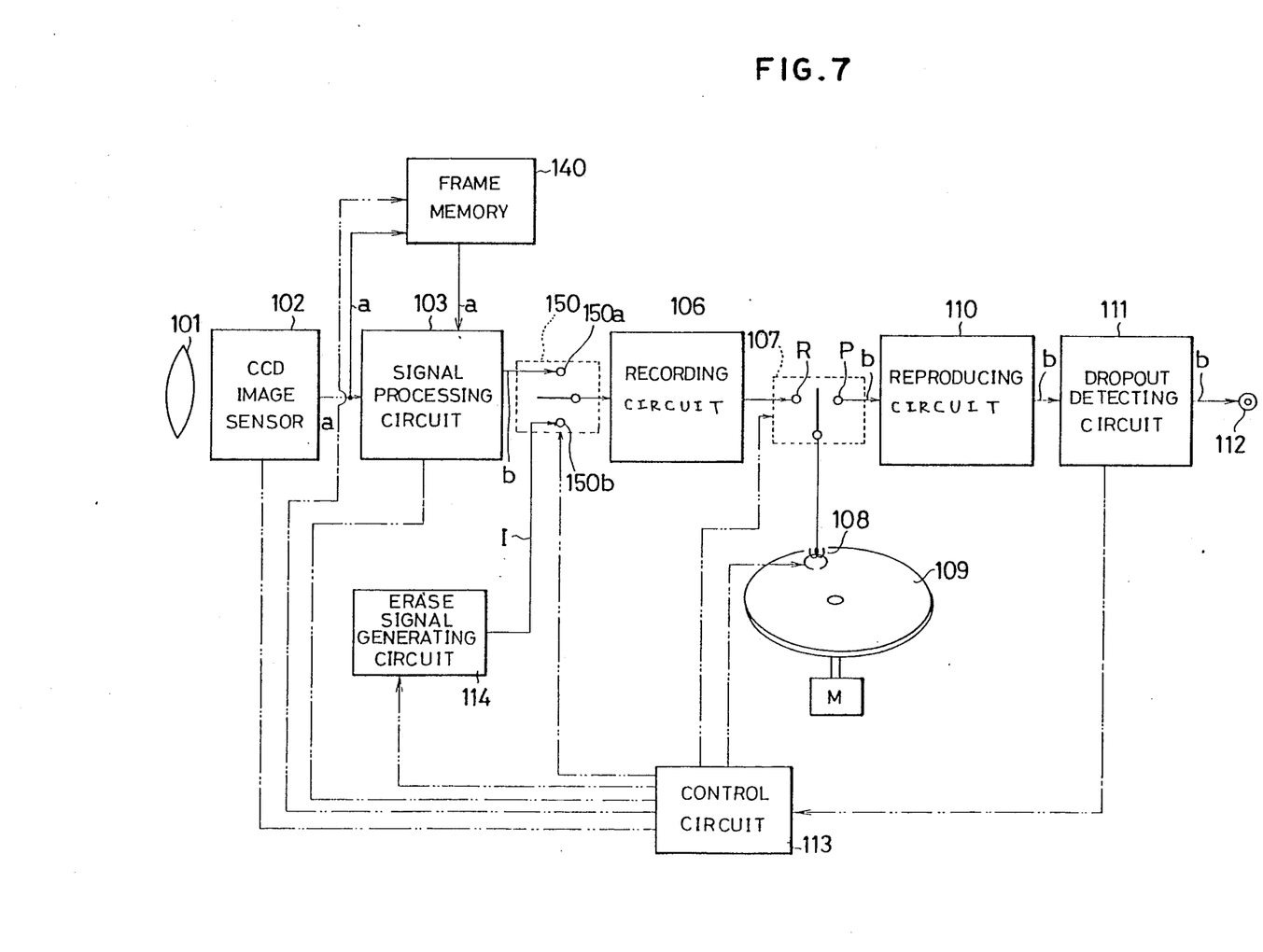

FIG. 7 is a block diagram showing the structure of an electronic still camera which is a fourth embodiment of the present invention. In FIG. 7, like reference numerals are used to designate like parts appearing in FIG. 6.

Referring to FIG. 7, an electrical image signal a is applied from an image sensor 102 to a signal processing circuit 103 and a frame memory 140, and a video signal b appearing from the signal processing circuit 103 is recorded in a magnetic disk 109. When a dropout detecting circuit 111 detects a dropout in the video signal b reproduced by a magnetic head 108 from a track of a magnetic floppy disk 109, the recording is erased, and the video signal b is recorded again on the track under control of a control circuit 113 in a manner as described below. In response to the detection of the dropout, the control circuit 113 changes over selector switches 150 and 107 to their positions 150b and R respectively and actuates an erase signal generating circuit 114. The erase signal generating circuit 114 generates an erase signal I to erase the recording on the track containing the dropout. After the recording has been erased, the selector switch 150 is changed over from the position 150b to a position 150a, and the image signal a stored in the frame memory 140 is read out and applied to the signal processing circuit 103. In the signal processing circuit 103, the image signal a is converted into the video signal b, and this video signal b is recorded on the track again from which the record has been erased. It is apparent that a dropout-free video signal is recorded on the floppy disk 109 in a normal manner similar to that described in the third embodiment shown in FIG. 6.

Embodiment 5

Figure 8:
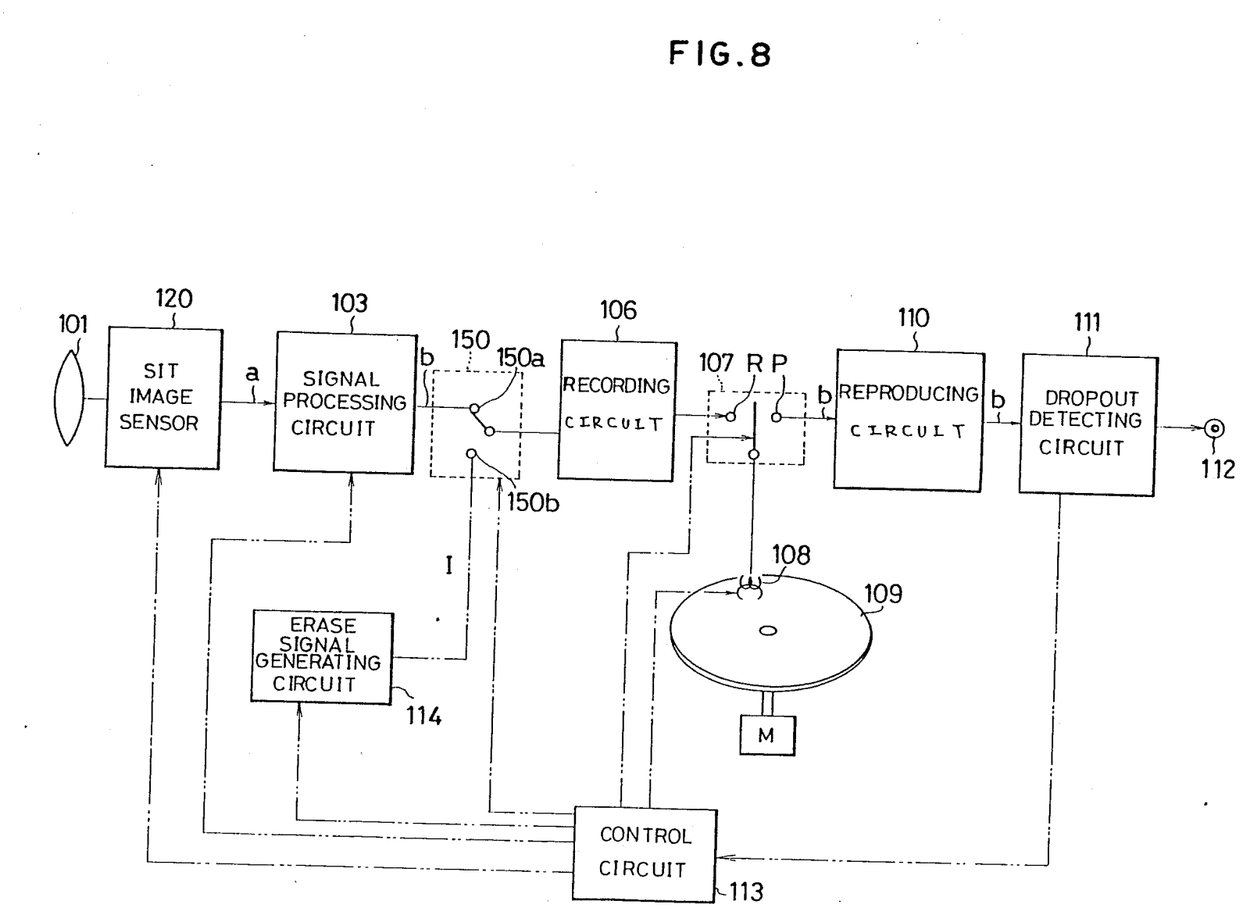

FIG. 8 is a block diagram showing the structure of an electronic still camera which is a fifth embodiment of the present invention. In FIG. 8, like reference numerals are used to designate like parts appearing in FIG. 7. This fifth embodiment employs an image sensor 120 whose image pickup part includes static induction transistors (SIT). This SIT type image sensor 120 has the function of converting an incident optical image into an electrical image signal and storing the image signal after transmission of the image signal.

In the electronic still camera shown in FIG. 8, an optical image formed by an optical lens system 101 is converted by the image sensor 120 into an electrical image signal a, and this image signal a is converted by a signal processing circuit 103 into a video signal b. The video signal b is applied to a magnetic head 108 through a first selector switch 150 changed over to its position 150a, a recording circuit 106 and a second selector switch 107 changed over to its position R and is recorded by the magnetic head 108 on a track of a magnetic floppy disk 109. After recording, the selector switch 107 is changed over to its position P, and the video signal b reproduced from the track by the magnetic head 108 is applied through a reproducing circuit 110 to a dropout detecting circuit 111. When a dropout is detected by the dropout detecting circuit 111, the record is erased, and the video signal b is recorded again on the same track under control of a control circuit 113 in a manner as described below. That is, the selector switches 150 and 107 are changed over to their positions 150b and R respectively, and an erase signal generating circuit 114 is actuated to generate an erase signal I which is used to erase the recording on the track containing the dropout. After the recording has been erased, the selector switch 150 is changed over to its position 150a, and the image signal a stored in the image sensor 120 is applied to the signal processing circuit 103 to be converted into the video signal b. The video signal b is recorded again on the track from which the recording has been erased.

It will be understood from the foregoing description of the electronic still camera of the present invention that, when an accidental dropout occurs in a signal recorded on a track of a magnetic floppy disk due to attachment of dust or like foreign matter to, for example, a magnetic head, the recording on the track containing the dropout is erased, and the signal stored in, for example, a memory is read out and recorded again on the track from which the record has been erased. Before the signal is recorded again on the same track, the dust or like foreign matter is probably naturally removed in most cases, and a dropout-free picture of high quality can be recorded. Since the original signal is kept stored in the memory, the chance of taking the desired picture is not lost in spite of record erasing and signal re-recording.

We claim:
1. A still video recorder comprising:
    a magnetic floppy disk;
    a recording circuit including at least one magnetic head recording an externally applied video signal on a track of said floppy disk and reproducing the video signal from said track after having recorded the video signal on that track but before recording another externally applied video signal on the next predetermined track of said floppy disk;
    erasing means for erasing a recording from any one of a plurality of tracks of said floppy disk;
    a droput detecting circuit controlling said recording circuit and said erasing means so that, when said dropout detecting circuit detects a dropout in the record reproduced from the track of said floppy disk, the recording on the track containing the dropout is erased, and, after the recording has been completely erased, the externally applied video signal is recorded again on said track of said floppy disk by said magnetic recording head.

2. A still video recorder according to claim 1, further comprising means for previously setting a predetermined maximum number of times of repetition of erasing and re-recording operation on the same track under control of said control circuit, the erasing and re-recording operation being repeated within the extent of said predetermined maximum number of times until a dropout is completely removed.

3. An electronic still camera comprising:
 imaging means converting an optical image formed by an optical lens system into an electrical image signal;
 a signal processing circuit converting the image signal generated from said imaging means into a video signal;
 a memory storing the video signal;
 a magnetic floppy disk;
 erasing means for erasing a recording from any one of a plurality of tracks of said floppy disk;
 a magnetic recording and reproducing circuit including at least one magnetic head for recording the video signal on a track of said floppy disk and, immediately after having recorded the video signal, reproducing the video signal from the same track of said floppy disk;
 a dropout detecting circuit detecting whether or not a dropout is present in the video signal reproduced from the track of said floppy disk by said magnetic reproducing head in said magnetic recording and reproducing circuit; and
 a control circuit controlling said recording and reproducing circuit and said erasing means so that, when said dropout detecting circuit detects a dropout in the recording recorded on the track of said floppy disk, the recording on the track containing the dropout is erased, and after the recording on the track containing the dropout has been completely erased, the video signal stored in said memory is read out and recorded again on the same track of said floppy disk by said magnetic recording head in said magnetic recording and reproducing circuit.

4. An electronic still camera according to claim 3, further comprising means for previously setting a predetermined maximum number of times of repetition of erasing and re-recording operation on the same track under control of said control circuit, the erasing and re-recording operation being repeated within the extent of said predetermined maximum number of times until a dropout is completely removed.

5. An electronic still camera comprising:
 imaging means converting an optical image formed by an optical lens system in to an electrical image signal;
 a signal processing circuit converting the image signal generated from said imaging means into a video signal;
 a memory storing the image signal;
 a magnetic floppy disk;
 erasing means for erasing a recording for any one of a plurality of tracks of said floppy disk;
 a magnetic recording and reproducing circuit including at least one magnetic head for recording the video signal on a track of said floppy disk, and, immediately after having recorded the video signal, reproducing the video signal from the same track of said floppy disk;
 a dropout detecting circuit detecting whether or not a dropout is present in the video signal reproduced from the track of said floppy disk by said magnetic reproducing head in said magnetic recording and reproducing circuit; and
 a control circuit controlling said recording and reproducing circuit and said erasing means so that, when said dropout detecting circuit detects a dropout in the recording reproduced from the track of said floppy disk, the recording on the track containing the dropout is erased, and, after the recording has been complete erased, the image signal stored in said memory is read out and converted into the video signal by said signal processing circuit, said video signal being recorded again on the same track of said floppy disk by said magnetic recording head in said magnetic recording and reproducing circuit.

6. An electronic still camera according to claim 5, further comprising means for previously setting a predetermined maximum number of times of repetition of erasing and re-recording operation on the same track under control of said control circuit, the erasing and re-recording operation being repeated within the extent of said predetermined maximum number of times until a dropout is completely removed.

7. An electronic still camera comprising:
 imaging means converting an optical image formed by an optical lens system into an electrical image signal and storing the image signal even after delivery of the image signal;
 a signal processing circuit converting the image signal generated from said imaging means into a video signal;
 a magnetic floppy disk;
 erasing means for erasing a recording from any one of a plurality of tracks of said floppy disk;
 a magnetic recording and reproducing circuit including at least one magnetic head for recording the video signal on a tack of said floppy disk, and, immediately after having recorded the video signal, reproducing the video signal from the same track of said floppy disk;
 a dropout detecting circuit detecting whether or not a dropout is present in the video signal reproduced from the track of said floppy disk by said magnetic head in said magnetic recording and reproducing circuit; and
 a control circuit controlling said recording and reproducing circuit and said erasing means so that, when said dropout detecting circuit detects a dropout in the recording reproduced from the track of said floppy disk, the recording on the track containing the dropout is erased, the image signal stored in said imaging means is read out and converted into the video signal by said signal processing circuit, said video signal being recorded again on the same track of said floppy disk by said magnetic recording head in said magnetic recording and reproducing circuit.

8. An electronic still camera according to claim 7, further comprising means for previously setting a predetermined maximum number of times of repetition of erasing and re-recording operation on the same track under control of said control circuit, the erasing and re-recording operation being repeated within the extent of said predetermined maximum number of times until a dropout is completely removed.

* * * * *